US008422791B2

(12) United States Patent
Liu et al.

(10) Patent No.: US 8,422,791 B2
(45) Date of Patent: Apr. 16, 2013

(54) DETECTION OF ABANDONED AND VANISHED OBJECTS

(75) Inventors: Qiang Liu, Artamon (AU); David Grant McLeish, Northmead (AU); Jarrad Michael Springett, Cambridge (GB)

(73) Assignee: Canon Kabushiki Kaisha, Tokyo (JP)

( * ) Notice: Subject to any disclaimer, the term of this patent is extended or adjusted under 35 U.S.C. 154(b) by 721 days.

(21) Appl. No.: 12/623,856

(22) Filed: Nov. 23, 2009

(65) Prior Publication Data
US 2010/0128930 A1    May 27, 2010

(30) Foreign Application Priority Data

Nov. 24, 2008 (AU) ................................ 2008906612
Dec. 30, 2008 (AU) ................................ 2008264228

(51) Int. Cl.
*G06K 9/48* (2006.01)
*G06K 9/00* (2006.01)
*G06K 9/62* (2006.01)

(52) U.S. Cl. ........ 382/199; 382/103; 382/224; 348/169; 340/568.1

(58) Field of Classification Search .................. 382/103, 382/199, 206, 224, 235, 266; 340/568.1; 348/169
See application file for complete search history.

(56) References Cited

U.S. PATENT DOCUMENTS

| | | | |
|---|---|---|---|
| 5,969,755 A | 10/1999 | Courtney ....................... 348/143 |
| 6,731,805 B2 | 5/2004 | Brodsky et al. ............... 382/199 |
| 6,961,447 B2 | 11/2005 | Onuma et al. ................. 382/103 |
| 6,999,600 B2 | 2/2006 | Venetianer et al. ........... 382/103 |
| 7,801,330 B2 * | 9/2010 | Zhang et al. .................. 382/103 |
| 7,825,954 B2 * | 11/2010 | Zhang et al. .................. 348/169 |
| 8,107,678 B2 * | 1/2012 | Feris et al. .................... 382/103 |
| 2004/0151342 A1 * | 8/2004 | Venetianer et al. ........... 382/103 |
| 2007/0122000 A1 * | 5/2007 | Venetianer et al. ........... 382/103 |
| 2008/0152236 A1 | 6/2008 | Vendrig et al. ................ 382/224 |
| 2009/0060278 A1 * | 3/2009 | Hassan-Shafique et al. . 382/103 |
| 2009/0219391 A1 | 9/2009 | McLeish et al. |

OTHER PUBLICATIONS

Convolution-Based Edge Detection for Image/Video in Block DCT Domain, Journal of Visual Communications and Image Representation, 1996, pp. 411-423.*

* cited by examiner

*Primary Examiner* — John Strege
(74) *Attorney, Agent, or Firm* — Fitzpatrick, Cella, Harper & Scinto

(57) ABSTRACT

Disclosed herein are a method and system for classifying a detected region of change of a video frame as one of an abandoned object event and an object removal event, wherein a plurality of boundary blocks define a boundary of said region of change. For each one of a set of said boundary blocks (510), the method determines a predicted edge characteristic (520) and an observed edge characteristic (530) for said boundary block. The method then determines an individual block score (540) for said boundary block, based on said predicted edge characteristic (520) for said boundary block and said observed edge characteristic (530) for said boundary block. Once all of the set of boundary blocks have been processed, the method determines a global score (560) for said region of change, based on said individual block scores of said boundary blocks. The method then classifies the region of change (570) as an abandoned object event or an object removal event, based on how the overall score relates to a threshold.

15 Claims, 15 Drawing Sheets

DETECTION OF ABANDONED AND VANISHED OBJECTS

RELATED APPLICATION

This application claims the right of priority under 35 U.S.C. §119 based on Australian Provisional Patent Application No. 2008906612 entitled "Multiple JPEG coding of same image", filed on 24 Nov. 2008 in the name of Canon Kabushiki Kaisha, and Australian Patent Application No. 2008264228 entitled "Detection of abandoned and vanished objects", filed on 30 Dec. 2008 in the name of Canon Kabushiki Kaisha, the entire contents of which are incorporated herein by reference as if fully set forth herein.

TECHNICAL FIELD

The present disclosure relates generally to video analytics and, in particular, to the detection of stationary foreground objects in video, or the removal of objects from video that were previously considered background.

DESCRIPTION OF BACKGROUND ART

Video cameras, such as Pan-Tilt-Zoom (PTZ) cameras, are omnipresent nowadays, and are often utilised for surveillance purposes. The cameras typically capture more data (video content) than human viewers can process. Automatic analysis of video content is therefore needed.

One step often used in the processing of video content is the segmentation of video data into foreground objects and a background scene, or background. Such segmentation allows for further analysis of the video content, such as detection of specific foreground objects, or tracking of moving objects. Such further analysis may, for example, result in sending an alert to a security guard, perhaps upon detection of a foreground object or tracking an object entering or leaving a predefined area of interest.

Two aspects of such analysis are of particular interest. First is the detection of abandoned objects. An example of an abandoned object is an object, such as an item of luggage, that has been brought into a scene that is being monitored over a sequence of video frames and wherein the object is subsequently left in the scene. Second is the detection of object removal. Object removal relates to detecting that an object, which was previously considered part of the background of a scene that is being monitored over a sequence of video frames, has been removed from the scene.

A common approach to foreground/background segmentation is background subtraction. For example, the median pixel value for a position in a scene over a sequence of video frames may be compared against the current pixel value at that position in a current frame of the sequence of video frames. If the current pixel value is similar to the median pixel value, the pixel is considered to belong to the background. Otherwise, if the current pixel value is not similar to the median pixel value, wherein the difference between the current pixel value and the median pixel value exceeds a threshold, the pixel is considered to belong to a foreground object.

Using a background subtraction approach, abandoned object events and object removal events have similar properties. Both abandoned object events and object removal events appear as a region of the scene that is different from a remembered background, but the region is otherwise not changing. It is advantageous to use a common technique to detect when either an abandoned object event or object removal event has occurred, and raise an alert.

A difficulty of using such an approach to detect abandoned objects and object removal events is that, to the camera, abandoned object events and object removal events appear indistinguishable from each other using only background subtraction. However, it is often desirable for a surveillance system to be able to draw the attention of an operator to such events, and to be able to give different alerts based on the type of event that has occurred. In some cases, abandoned object events may be of greater importance than object removal events, such as in a busy airport. In other cases, object removal events may be of greater importance than abandoned object events, such as in an art gallery.

It is possible to differentiate between the two events, to some degree, through a comparison of the boundary pixels of detected regions of change and a background model. For example, a strong boundary on a region of change would more likely indicate an abandoned object event, and a weak boundary would more likely indicate an object removal event. Drawbacks to these pixel-based methods are costs in terms of both high memory usage and costly computation time.

Thus, a need exists to provide an improved method and system for detecting abandoned object events and object removal events in the monitoring of video frames.

SUMMARY

It is an object of the present invention to overcome substantially, or at least ameliorate, one or more disadvantages of existing arrangements.

According to a first aspect of the present disclosure, there is provided a computer-implementable method for classifying a detected region of change of a video frame as one of an abandoned object event and an object removal event, wherein a plurality of boundary blocks define a boundary of the region of change, the method comprising the steps of:
  (a) for each one of a set of the boundary blocks:
     (i) determining a predicted edge characteristic for the boundary block;
     (ii) determining an observed edge characteristic for the boundary block; and
     (iii) determining an individual block score for the boundary block, based on the predicted edge characteristic for the boundary block and the observed edge characteristic for the boundary block;
  (b) determining a global score for the region of change, based on the individual block scores of the boundary blocks; and
  (c) classifying the region of change as one of an abandoned object event and an object removal event, by comparing the global score with a predetermined threshold.

According to a second aspect of the present disclosure, there is provided a computer readable storage medium having recorded thereon a computer program for directing a processor to execute a method for classifying a detected region of change of a video frame as one of an abandoned object event and an object removal event, wherein a plurality of boundary blocks define a boundary of the region of change, the computer program comprising:
  (a) code for processing each one of a set of the boundary blocks to:
     (i) determine a predicted edge characteristic for the boundary block;
     (ii) determine an observed edge characteristic for the boundary block; and
     (iii) determine an individual block score for the boundary block, based on the predicted edge characteristic for the boundary block and the observed edge characteristic for the boundary block;

(b) code for determining a global score for the region of change, based on the individual block scores of the boundary blocks; and (c) code for classifying the region of change as one of an abandoned object event and an object removal event, by comparing the global score with a predetermined threshold.

According to a third aspect of the present disclosure, there is provided a camera system for classifying a detected region of change of a video frame as one of an abandoned object event and an object removal event, wherein a plurality of boundary blocks define a boundary of the region of change, the camera system comprising:

a lens system;

a camera module coupled to the lens system to capture the video frame;

a storage device for storing a computer program; and a processor for executing the program, the program comprising:

(a) code for processing each one of a set of the boundary blocks to:

(i) determine a predicted edge characteristic for the boundary block;

(ii) determine an observed edge characteristic for the boundary block; and (iii) determine an individual block score for the boundary block, based on the predicted edge characteristic for the boundary block and the observed edge characteristic for the boundary block;

(b) code for determining a global score for the region of change, based on the individual block scores of the boundary blocks; and (c) code for classifying the region of change as one of an abandoned object event and an object removal event, by comparing said global score with a predetermined threshold.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the aforementioned methods.

Other aspects of the invention are also disclosed.

BRIEF DESCRIPTION OF THE DRAWINGS

One or more embodiments of the invention will now be described with reference to the following drawings, in which.

DETAILED DESCRIPTION

Figure 1:
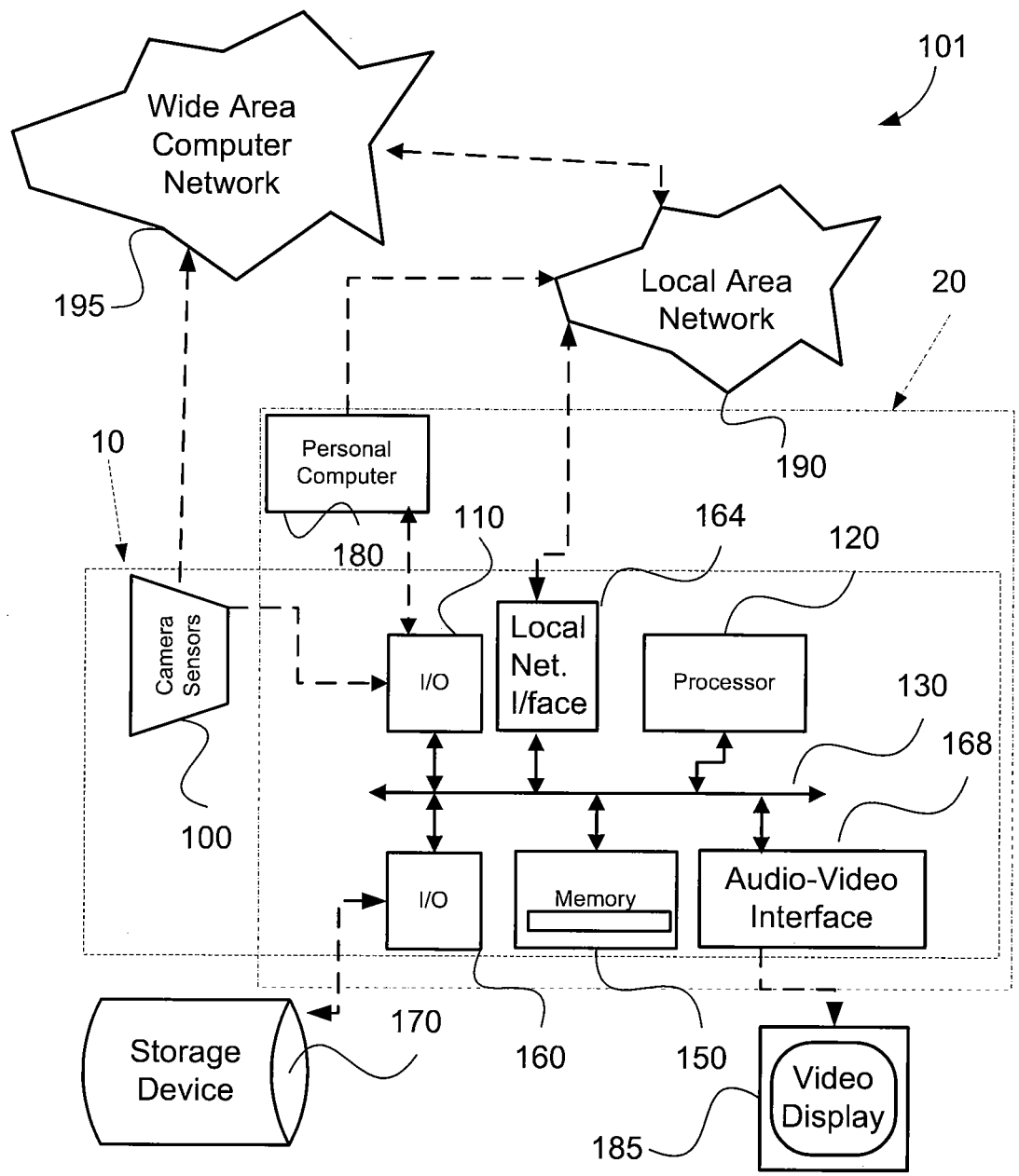
FIG. 1 is a schematic block diagram of an electronic system on which one or more described arrangements for detecting abandoned object and object removal events can be practised.

Where reference is made in any one or more of the accompanying drawings to steps and/or features that have the same reference numerals, those steps and/or features have for the purposes of this description the same function(s) or operation(s), unless the contrary intention appears.

Overview

Disclosed herein are a computer-implementable method and system for classifying a detected region of change of a video frame as one of an abandoned object event and an object removal event, wherein a plurality of boundary blocks define a boundary of the region of change. The boundary blocks may be, for example, Discrete Cosine Transform (DCT) blocks or pixels. For each one of a set of the boundary blocks, the method determines a predicted edge characteristic for the boundary block and an observed edge characteristic for the boundary block. In one embodiment, the predicted edge characteristic is calculated for a given boundary block based on the relative positioning of the arrangement of the boundary block and adjacent boundary blocks. The set of boundary blocks may include all of the boundary blocks that define the boundary of the region of change, or a subset of those boundary blocks, depending on the application. A reduced subset of boundary blocks may be used to reduce computational costs.

The method then determines an individual block score for the boundary block, based on the predicted edge characteristic for the boundary block and the observed edge characteristic for the boundary block. The method determines a global score for the region of change, based on the individual block scores of the boundary blocks. The method classifies the region of change as an abandoned object event or an object removal event, by comparing the global score with a predetermined threshold.

DESCRIPTION OF EMBODIMENTS

A video is a sequence of images or frames. Thus, each frame is an image in an image sequence. Each frame of the video has an x axis and a y axis. A scene is the information contained in a frame and may include, for example, foreground objects, background objects, or a combination thereof. A scene model is stored information relating to a background. A scene model generally relates to background information derived from an image sequence. A video may be encoded and compressed. Such encoding and compression may be performed intra-frame, such as motion-JPEG (M-JPEG), or inter-frame, such as specified in the H.264 standard.

An image is made up of visual elements. The visual elements may be, for example, pixels, or 8×8 DCT (Discrete Cosine Transform) blocks as used in JPEG images in a motion-JPEG stream.

For the detection of real-world objects visible in a video, a foreground separation method is applied to individual frames of the video, resulting in detections. Other methods of detecting real-world objects visible in a video are also known and may equally be practised. Such methods include, for example, image segmentation.

In one arrangement, foreground separation is performed by frame differencing. Frame differencing subtracts a current frame from a previous frame. In another arrangement, foreground separation is done by background modelling. That is, a scene model is created by aggregating the visual characteristics of pixels or blocks in the scene over multiple frames spanning a time period. Visual characteristics that have contributed consistently to the model are considered to form the background. Any area where the background model is different from the current frame is then considered to be foreground.

Video cameras are often utilised for surveillance purposes. The abandonment of objects and removal of objects are of particular interest in such applications. A common example of an abandoned object in a video surveillance setting is a dropped bag or suspicious package that is placed in a scene that is being observed over a sequence of video frames.

FIG. 1 is a schematic block diagram of an electronic system 101 on which one or more described arrangements for detecting abandoned object and object removal events can be practised. Sensors 100 are used to obtain the images of the image sequence. The sensors may represent a stand alone sensor device (i.e., detector or a security camera) or be part of an imaging device, such as camera, mobile phone, etc. The remaining electronic elements 110 to 168 may also be part of the imaging device comprising camera sensors 100, as indicated by dotted line 10. The electronic elements 110 to 168 may also be part of a computer system that is located either locally or remotely with respect to the sensors 100. In the case indicated by dotted line 20, electronic elements form a part of personal computer 180.

The transmission of the images from the camera sensors 100 to the processing electronics 120 to 168 is facilitated by an input/output interface 110, which could be a serial bus compliant with Universal Serial Bus (USB) standards and having corresponding USB connectors. Alternatively, the image sequence may be retrieved from camera sensors 100 via Local Area Network 190 or Wide Area Network 195. The image sequence may also be downloaded from a local storage device (e.g., 170), that can include SIM card, SD card, USB memory card, etc.

The images are obtained by input/output interface 110 and sent to the memory 150 or another of the processing elements 120 to 168 via a system bus 130. The processor 120 is arranged to retrieve information relating to one or more video frames from sensors 100 or from memory 150. The processor 120 is also arranged to fetch, decode and execute all steps of the disclosed method. The processor 120 then records the results from the respective operations to memory 150, again using system bus 130. Apart from memory 150, the output could also be stored more permanently on a storage device 170, via an input/output interface 160. The same output may also be sent, via network interface 164, either to a remote server which may be part of the network 190 or 195, or to personal computer 180, using input/output interface 110. The output may also be displayed for human viewing, using AV interface 168, on a monitor 185. Alternatively, the output may be processed further. One example of further processing may include using the output data, written back to memory 150, memory 170 or computer 180, as the input to a background modelling system.

As was discussed above and indicated in FIG. 1, the above method may be embodied in various forms. In the particular form, indicated by rectangle 10 in FIG. 1, the method is implemented in an imaging device, such as a camera, a network camera, or a mobile phone with a camera. In this case, all the processing electronics 110 to 168 will be part of the imaging device, as indicated by rectangle 10. As already mentioned in the above description, such an imaging device for capturing a sequence of images and processing information from one or more of the captured images will comprise: a sensor 100, memory 150, a processor 120, an input/output interface 110 and a system bus 130. The sensor 100 is arranged for capturing imaging data relating to visual elements of each image in the sequence of images. The memory 150 is used for storing each image in the sequence of images captured by the sensor and background scene information. The processor 120 is arranged for receiving, from the sensor 100 or from the memory 150, stored background scene information. The processor 120 also computes predicted and observed edge characteristics for each visual element that defines a boundary of a region of change in a video frame that is being analysed.

Further, the processor 100 is arranged to determine a score for a set of visual elements that define the boundary of the region of change. Depending on the application and implementation, not every one of the visual elements that define the boundary of the region of change is processed by the processor 100. For some applications, for example, it may be sufficient to determine a score for every second or third, or some other selection, of those visual elements that define the boundary of the region of change. The processor is further arranged to determine an overall score for the region of change and thus determine whether the region of change relates to an abandoned object event or an object removal event. The input/output interface 110 facilitates the transmitting of the imaging data from the sensor 100 to the memory 150 and to the processor 120, while the system bus 130 transmits data between the input/output interface 110 and the processor 120.

Figure 2:
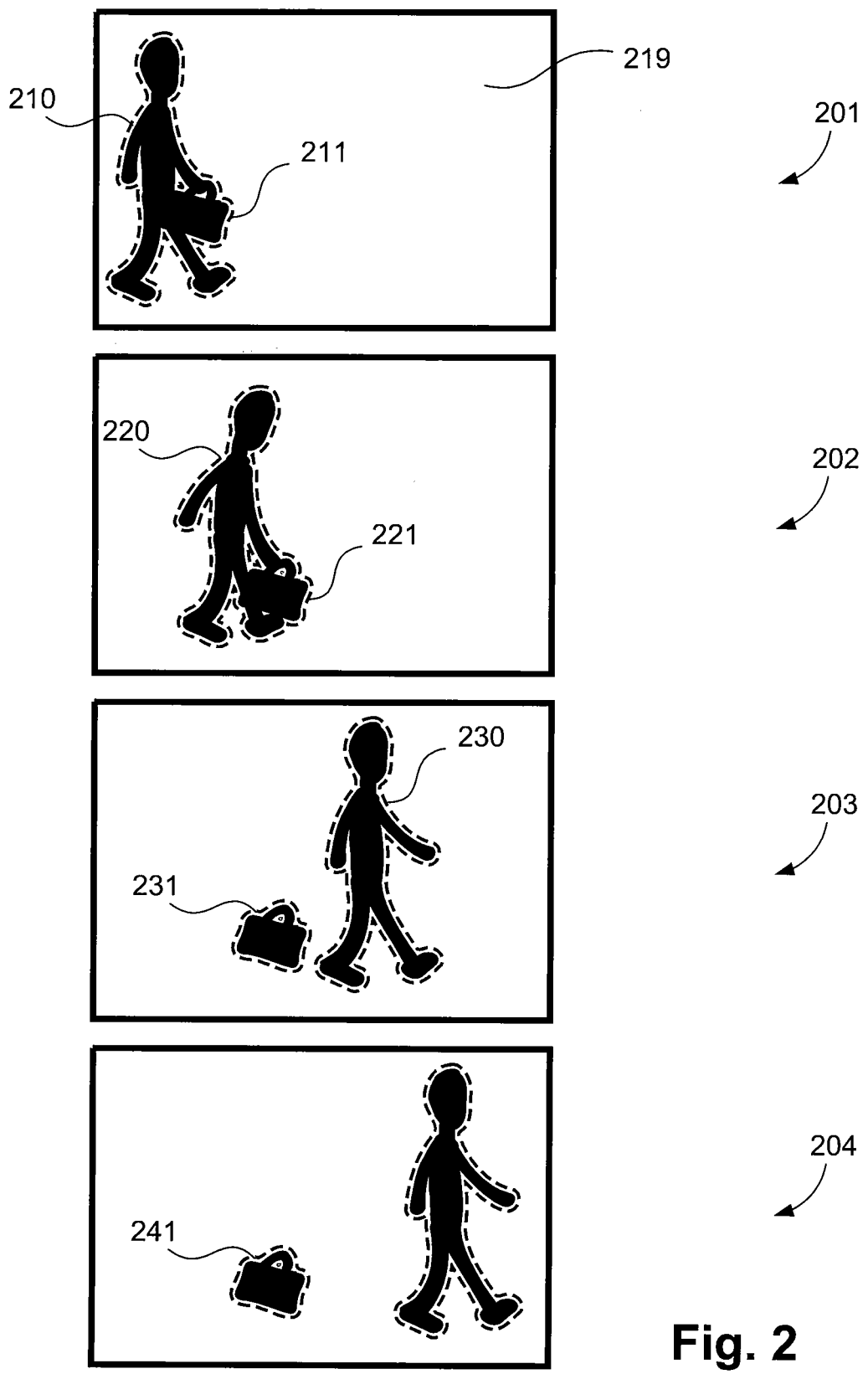
FIG. 2 is a schematic representation illustrating a video scene in which an object is abandoned.

FIG. 2 shows four sequential video frames 201 to 204 in a scenario that illustrates detection of an abandoned object. The sequential video frames 201 to 204 are not necessarily consecutive video frames. In one embodiment, for example, video frames are sampled at a predetermined periodic rate to minimise computational cost. Accordingly, the video frames 201 to 204 may represent every second, fifth, or tenth frame in a video sequence, for example. Alternatively, the video frames 201 to 204 may represent consecutive video frames. Further, the video frames 201 to 204 may be derived from a single video camera or multiple video cameras.

In a first frame 201, a person 210 enters a scene 219 carrying a bag 211. In a second, later frame 202, a person 220 lowers a bag 221 towards the floor (not shown). In a third, later frame 203, a person 230 walks away from a bag 231, which has been placed on the floor (not shown). In a fourth, later frame 204, a person 240 exits the scene and a bag 241 is on the floor (not shown). The appearance of the bag 231 when it first appears as a separate object, in the frame 203, does not substantially change in its appearance as the bag 241 in the later frame 204.

A second type of stationary change to a video scene is the removal of an object that was previously considered to form part of the background. In a video surveillance setting, removal of an object that was previously considered to form part of the background could relate to an item of value that is being monitored, such as a painting on a wall. In this case, the change to the visual appearance of the scene is not the object itself, but the newly observed background behind the (removed) object.

Figure 3:
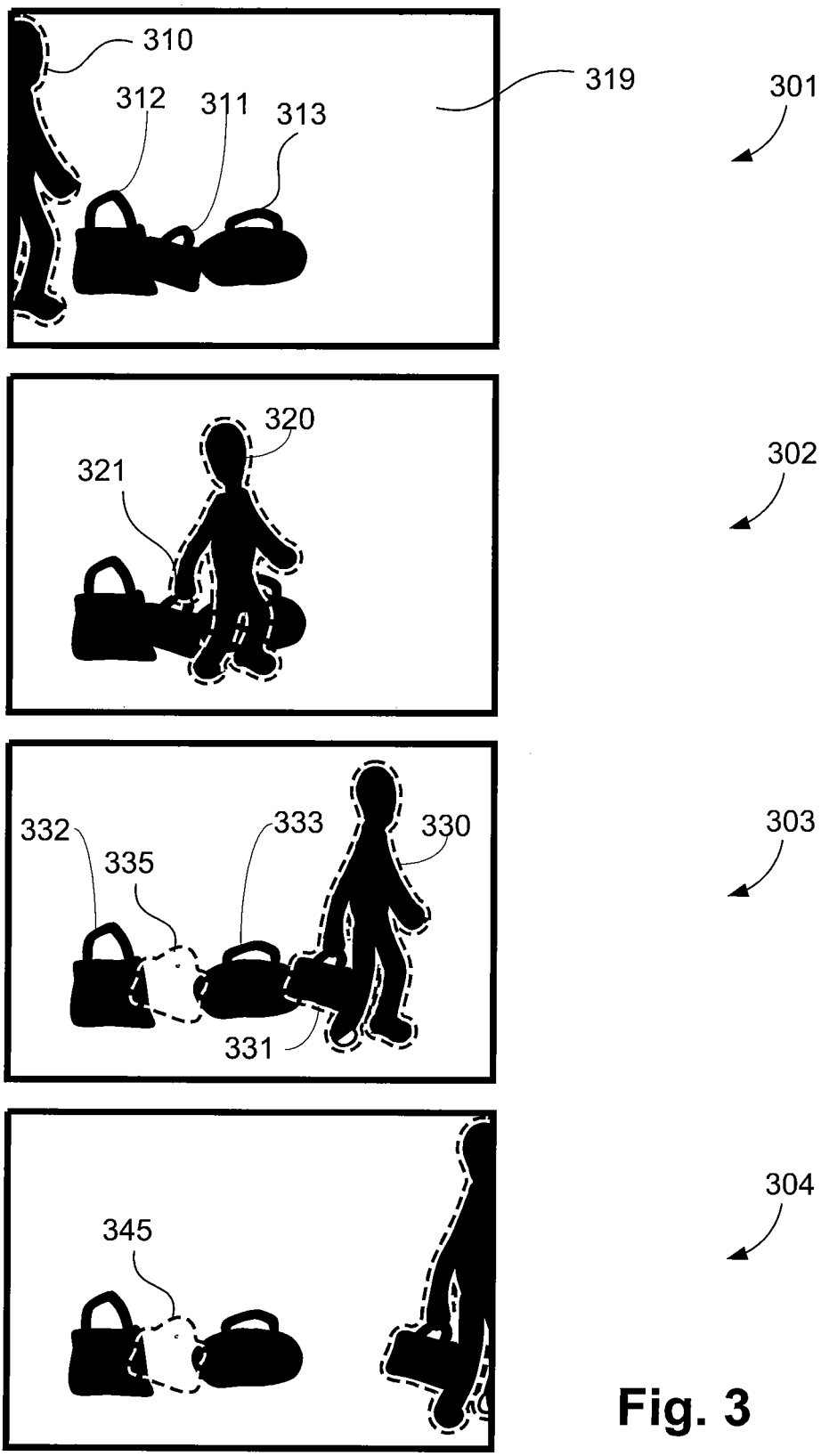
FIG. 3 is a schematic representation illustrating a video scene in which an object is removed.

FIG. 3 shows four sequential video frames 301 to 304 from an example that illustrates detection of object removal. As described above with reference to FIG. 2, the sequential video frames 301 to 304 are not necessarily consecutive video frames. In one embodiment, for example, video frames are sampled at a predetermined periodic rate to minimise computational cost. Accordingly, the video frames 301 to 304 may represent every second, fifth, or tenth frame in a video sequence, for example. Alternatively, the video frames 301 to 304 may represent consecutive video frames. Further, the video frames 301 to 304 may be derived from a single video camera or multiple video cameras.

In a first frame 301, three bags 311, 312, 313 are shown as part of a scene 319. The three bags 311, 312, and 312 have been part of the scene 319 long enough to be considered to be background, as may have been determined from analysis of one or more earlier video frames. A person 310 is shown to have entered the scene 319. In a second, later frame 302, a person 320 takes hold of a bag 321, and in a third, later frame 303, a person 330 walks away from bags 332, 333, while holding bag 331. In frame 303, the appearance of the background differs in a region 335 that the bag 331 previously occupied. However, the new appearance of region 345 does not vary in a fourth, later frame 304.

These two types of stationary changes, relating respectively to an abandoned object event and an object removal event, have similar properties. In both cases, the visual elements that constitute the region of change (i.e., the bag 241 in FIG. 2, and the "empty" region 345 in FIG. 3) are different in appearance from the background model, but otherwise do not change in appearance in subsequent frames during the period of analysis. Hence, these two types of stationary changes can both be classified as regions of change and be potential events that should trigger an alert.

Figure 4:
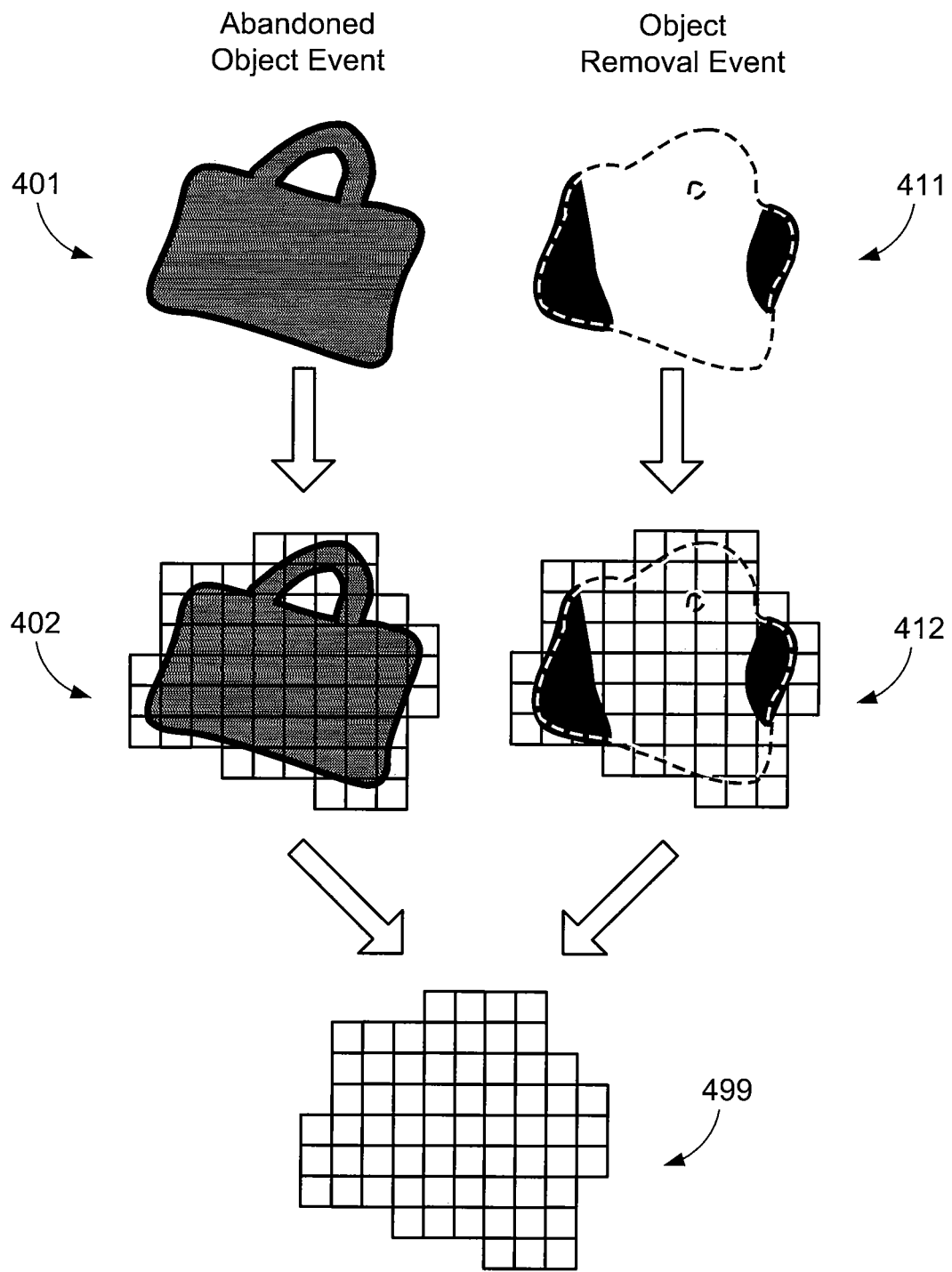
FIG. 4 is a schematic representation illustrating a region of change detected by a camera for both abandoned object and object removal events.

FIG. 4 illustrates a region of change for both abandoned object events and object removal events. FIG. 4 shows a bag 401 and an "empty" region 411. The "empty" region 411 corresponds to the change in background in frame 303 when bag 331 is picked up by the person 330. The bag 401 produces a first region of change 402 and the "empty" region produces a second region of change 412. The first and second regions of change 402 and 412 are difficult to distinguish automatically from one another, based only on a region 499.

Differentiating Between Abandoned and Removed Object Events

Figure 5:
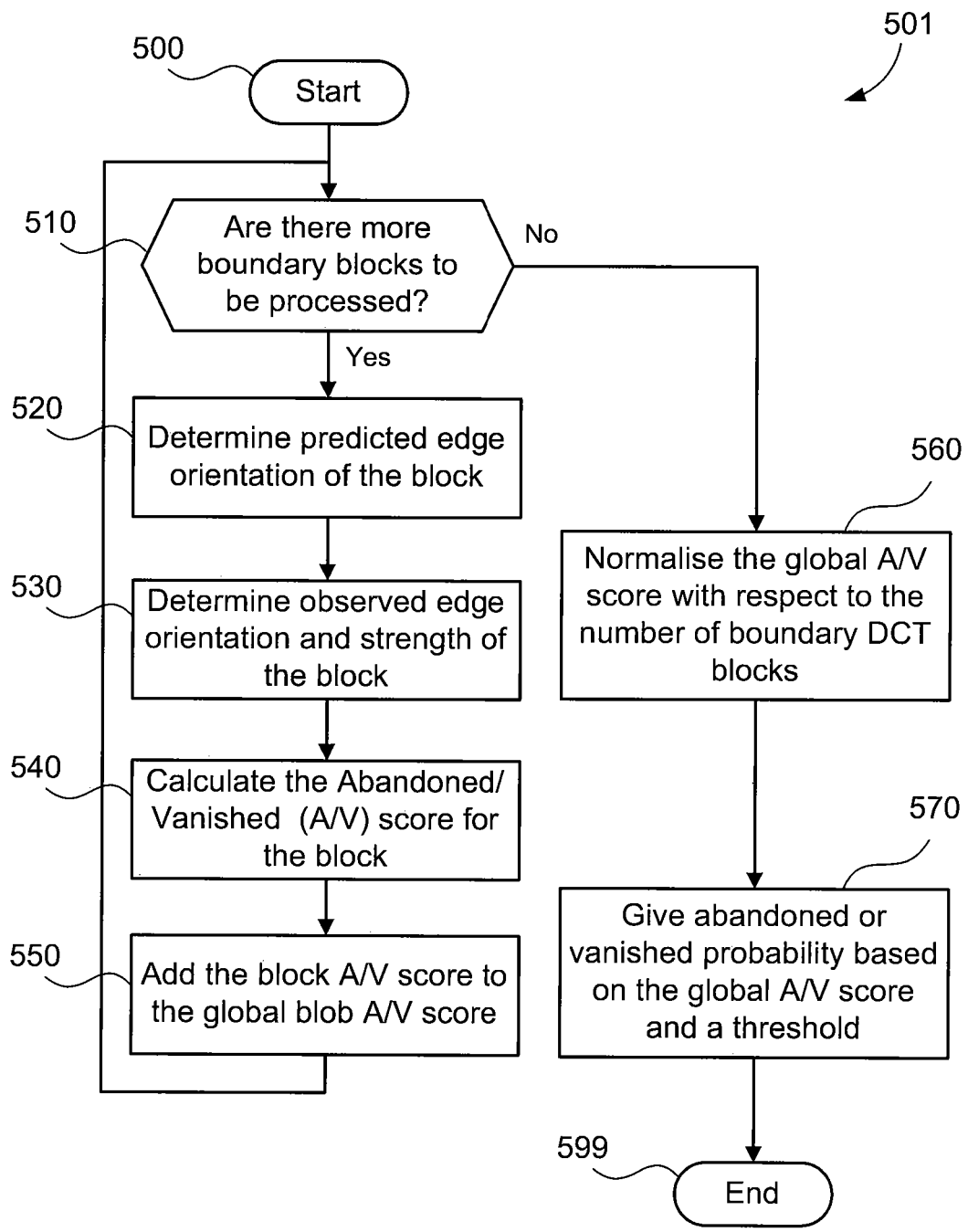
FIG. 5 is a schematic flow diagram illustrating a method of distinguishing abandoned object and object removal events, according to one embodiment of the present disclosure.

FIG. 5 is a flow diagram of a process 501 that illustrates functionality associated with a data processing architecture according to an embodiment of the present disclosure, such that abandoned object events and object removal events may be differentiated from each other. The process 501 calculates a correlation score between an appearance of each of the boundary blocks of a detected region of change, and an observed edge calculated from the boundary blocks. In one embodiment, the blocks used are Discrete Cosine Transform (DCT) blocks of the video images. However, blocks that are the results of other transformation methods can equally be used without departing from the spirit and scope of the present disclosure.

Figure 9:
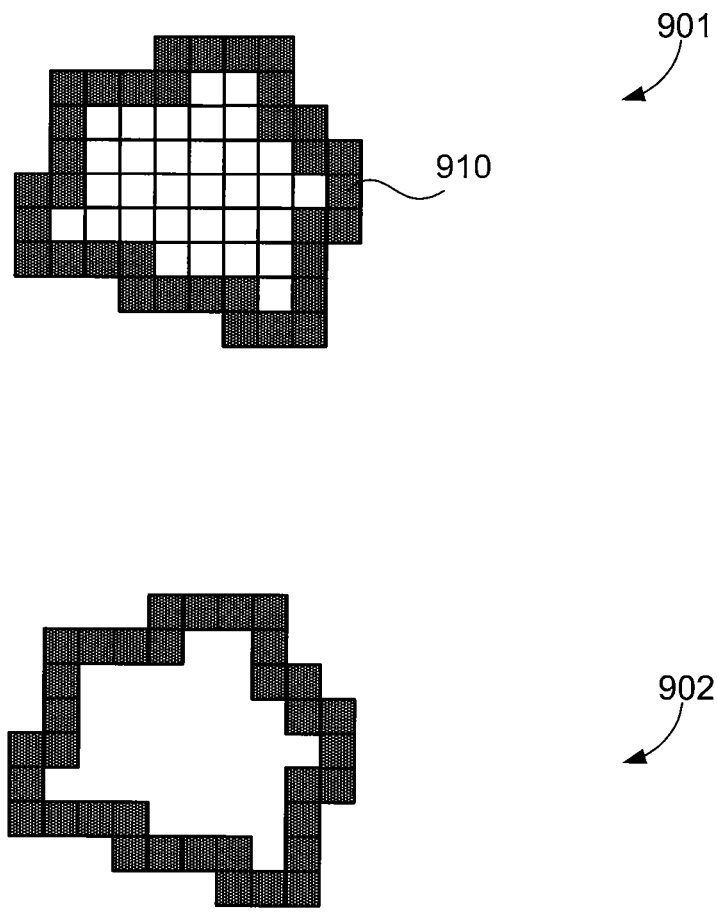
FIG. 9 is a schematic representation illustrating an example of a detected region of change with boundary DCT blocks highlighted.

The process 501 starts at a step 500 with an input that includes one or more boundary blocks of a detected region of change. FIG. 9 shows an example of a detected region of change 901 with boundary blocks highlighted, and an exemplary input to the process 501 is shown as input 902. One method for determining an object boundary is disclosed in United States Patent Publication No. 2008/0152236 (Vendrig et al.). Other methods for determining a visual object boundary may equally be utilised, such as pixel based object detection and user definition.

Returning to FIG. 5, control proceeds from step 500 to decision step 510, which determines if there are still more boundary blocks to be processed. If there are more boundary blocks to be processed, Yes, control passes to step 520, which determines a predicted edge orientation of the boundary block to be processed. This determination step is performed, for example, based on the location of nearby boundary blocks (as is described in more detail with reference to FIG. 10), or through user input. Control passes from step 520 to step 530, which calculates an observed edge orientation and observed edge strength for the boundary block, based on equations using the DCT coefficients of the block. Control then passes to step 540, which utilises the predicted and observed edge orientations, along with the observed edge strength of the boundary block, to calculate an individual block score, or abandoned/vanished (A/V) score, to determine how likely it is that this particular boundary block contains a physical object boundary. Step 550 adds the score for the boundary block to a global score for the whole detected region of change.

Returning to step 510, if there is not another boundary block left to be processed, No, the process 501 is directed from the step 510 by a NO arrow to step 560, which normalises the global A/V score with respect to the number of boundary blocks processed. Control passes from step 560 to step 570, which determines, based on the normalised global A/V score, whether the detected region of change is an abandoned object or a removed object. This determination can be, for example, a binary abandoned/removed answer based on a threshold, or a probabilistic answer concerning the likelihood of the detected region of change to be either abandoned or removed. Finally, the process 501 is directed to an END step 599, which completes the processing with respect to the input.

Boundary Traversal for Regions of Change

The method described above with reference to FIG. 5 requires the boundary blocks of a detected region of change as an input. Boundary blocks can be found in a number of ways known in the art, or alternatively the boundary blocks can be specified through user input.

Figure 6:
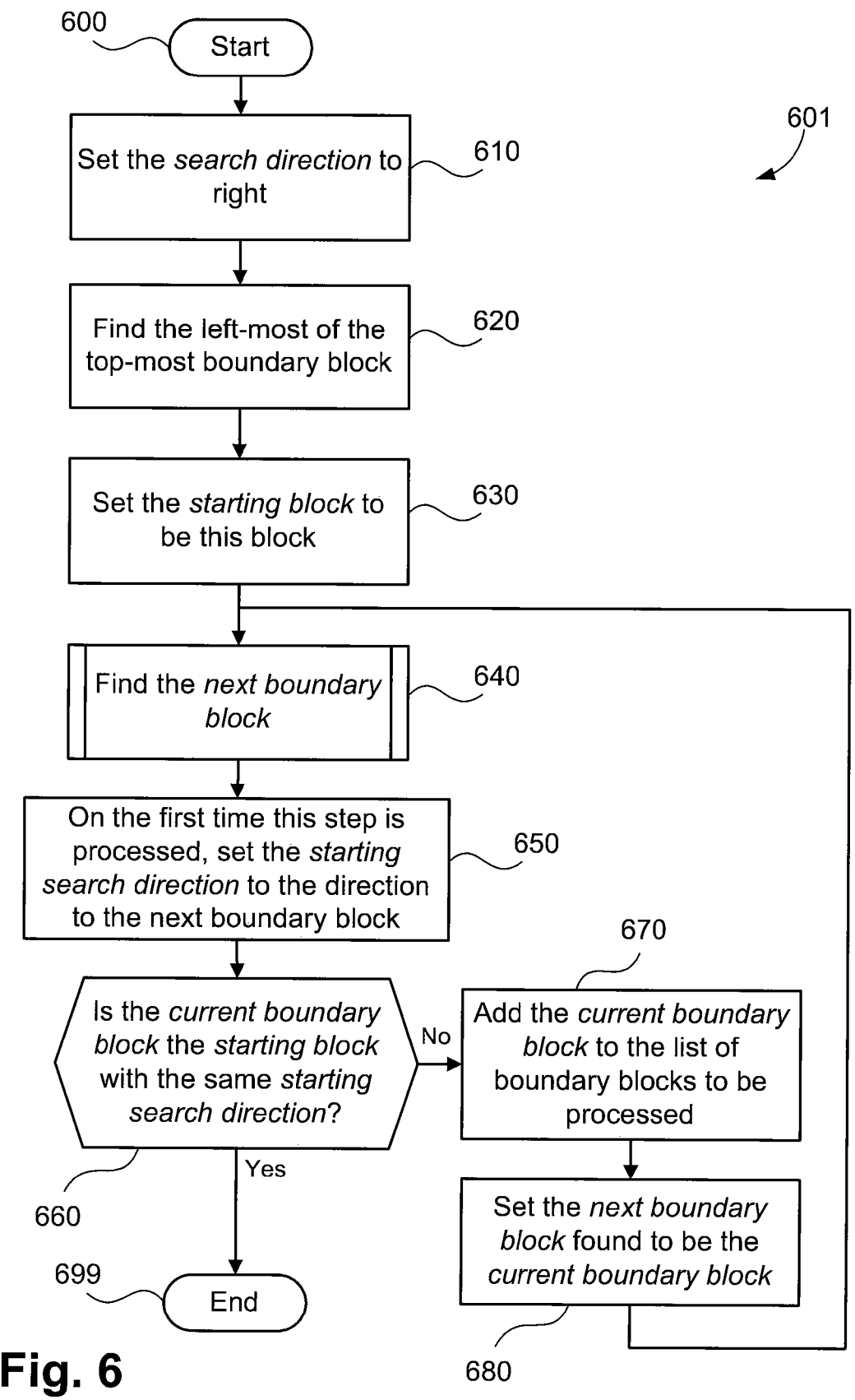
FIG. 6 is a schematic flow diagram illustrating a method of traversing boundary blocks of a detected region of change.

FIG. 6 is a flow diagram of a process 601 for determining a set of boundary blocks of a detected region of change. The process 601 starts at step 600 with an input comprising blocks of a detected region of change, as described earlier with reference to the region of change 499 of FIG. 4. Control passes to step 610, which sets a search direction to right and control passes to step 620, which traverses the top row of the blocks comprising the detected region of change to identify a "left-most" boundary block of the top row of blocks that is located furthest to the left. Step 630 sets the identified left-most block of the top row of bounding blocks as a starting block, the block from which traversal of the bounding blocks will begin. Flow then passes to step 640, which identifies a next boundary block. Identification of the next boundary block will be discussed in greater detail below, with reference to FIG. 7.

Control passes from step 640 to decision step 650, which on the first time the step is processed sets a starting search direction to be the direction to a next boundary block immediately following the starting block. The variables starting block and starting search direction are used as termination conditions. Control passes to decision step 660, which determines whether to terminate traversal of the bounding blocks, based on whether a current boundary block is the starting boundary block and a current search direction is the same as the starting search direction. If the current boundary block is not the starting boundary block and/or the current search direction is not the same as the starting search direction, No, flow is directed to step 670, which adds the current boundary block to a list of boundary blocks to be processed, and step 680 sets the next boundary block found in step 640 to the current boundary block. Flow then passes to step 640 to continue the traversal of the boundary blocks. Returning to decision step 660, if the current boundary block is the starting boundary block and the current search direction is the same as the starting search direction, and thus traversal of the boundary blocks has arrived back at the start, then the process 601 passes to an END step 699, which completes the processing with respect to the input, and a list of the boundary blocks of a region of change is outputted, as illustrated by input 902 of FIG. 9.

It will be appreciated by a person skilled in the art that, while the process 601 of FIG. 6 utilises a left-most block on a top row of the boundary blocks as a starting block and an initial search direction to the right, other starting blocks and initial search directions may equally be practised without departing from the spirit and scope of the present disclosure. For example, a starting block of the right-most block on a top or bottom row of boundary blocks and an initial search direction to the left may equally be utilised.

In one embodiment, processing to differentiate between abandoned object and object removal events is performed while the boundary traversal is being conducted.

Figure 7:
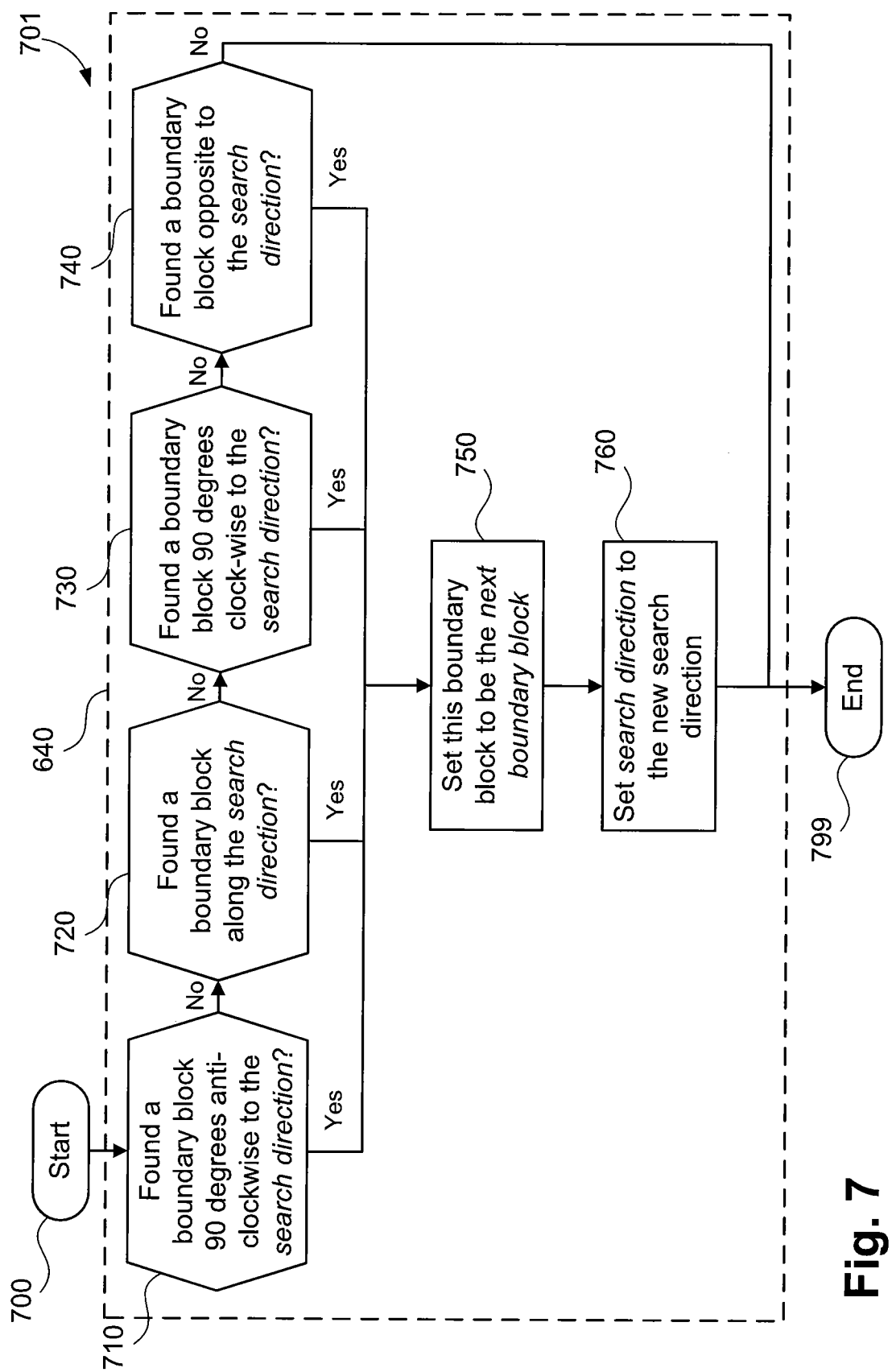
FIG. 7 is a schematic flow diagram illustrating a method of iterating successive boundary blocks of a detected region of change, as used in the method of FIG. 6.

FIG. 7 is a schematic flow diagram of a method 701 of determining the next boundary block of a region of change according to step 640 of FIG. 6. The process 701 starts at a Start step 700 with inputs comprising of the blocks of a detected region of change, as well as the variables current boundary block and search direction.

The process for traversing the boundary blocks searches for a next boundary block by looking at boundary blocks that are adjacent to a current boundary block. In this embodiment, the boundary blocks adjacent to the current boundary block are examined in the following order: (i) 90 degrees anticlockwise to the search direction 710; (ii) along the search direction 720; (iii) 90 degrees clockwise to the search direction 730; and (iv) opposite to the search direction 740. If any of these searches discovers a boundary block (described in detail with reference to FIG. 8), flow is directed via a YES arrow to step 750 where the newly discovered boundary block is set to be the next boundary block, and the search direction used to traverse to this block is set as the new search direction in step 760.

FIG. 7 begins at a Start step 700 and proceeds to a first decision step 710, which determines whether there is a boundary block adjacent to the current boundary block in a direction 90 degrees anti-clockwise to the search direction. If Yes, control passes to step 750. However, if there is not a boundary block adjacent to the current boundary block in a direction 90 degrees anti-clockwise to the search direction, No, control passes from step 710 to a second decision step 720. Step 720 determines whether there is a boundary block adjacent to the current boundary block along the search direction. If Yes, control passes to step 750. However, if there is not a boundary block adjacent to the current boundary block along the search direction, No, control passes from step 720 to a third decision step 730. Step 730 determines whether there is a boundary block in a direction 90 degrees clockwise to the search direction. If Yes, control passes to step 750. However, if there is not a boundary block adjacent to the current boundary block in a direction 90 degrees clockwise to the search direction, No, control passes from step 730 to step 740. Step 740 determines whether there is a boundary block adjacent to the current boundary block in the opposite direction to the search direction. If Yes, control passes to step 750. However, if there is not a boundary block adjacent to the current boundary block in the direction opposite the boundary block, No, control passes from step 740 to an End step 799 and the process 701 terminates.

Step 750 sets the newly discovered boundary block to be the next boundary block, and step 760 sets the search direction used to traverse to this block as the new search direction. The process 701 then proceeds to the END step 799, which completes the processing with respect to the input.

Figure 8:
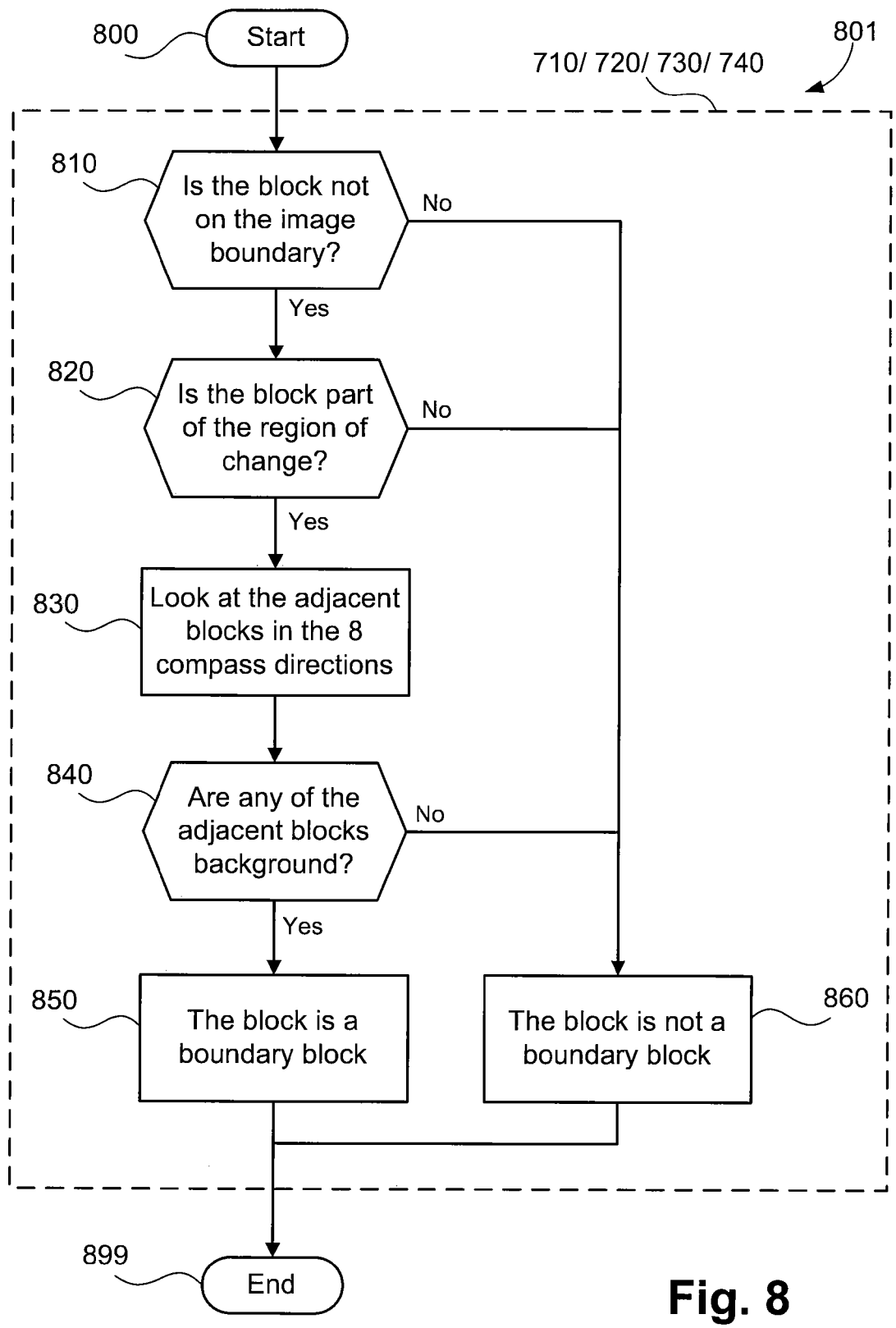
FIG. 8 is a schematic flow diagram illustrating a method of determining whether a DCT block is a boundary DCT block, as used in the method of FIG. 7.

FIG. 8 is a flow diagram that illustrates an embodiment of a process 801 to determine whether a block under consideration is a boundary block of a detected region of change. The process 801 starts at a Start step 800 with an input comprised of a potential boundary block, as well as 8 surrounding blocks that surround the potential boundary block. All nine blocks are encoded with information regarding whether the respective blocks are part of the detected region of change.

In a following step 810, the process checks whether the potential boundary block lies on the boundary of the image (i.e., on an edge of the image frame), by asking whether the block is not on a boundary of the image. If true, flow is directed by a NO arrow to step 860, which classifies the block as a non-boundary block. Returning to step 810, if the block does not lie on the image boundary, flow is directed via a YES arrow to step 820.

In step 820, the process checks whether the block is part of the region of change and thus does not form part of the background. If the block is not part of the region of change, No, flow is directed by a NO arrow to step 860, which classifies the block as a non-boundary block. Returning to step 820, if the block is part of the region of change, Yes, flow is directed from step 820 via a YES arrow to step 830.

In step 830, the process checks each of the 8 surrounding blocks in turn and step 840 determines whether any of the adjacent blocks is a background block (i.e., a block that is not part of the region of change). If a background block is found, Yes, step 840 directs the flow to step 850 via a YES arrow. Step 850 designates the current block as a boundary block. The process 801 then terminates at an END step 899.

Returning to step 840, if none of the surrounding adjacent blocks is detected as forming part of the background, No, then processing is directed to step 860 via a NO arrow. Step 860 designates the potential boundary block under consideration as a non-boundary block. The process 801 is directed from step 860 to an END step 899, which completes the processing with respect to the input.

Determination of Predicted Edge Characteristics

After process 501 receives a boundary block at step 520, a predicted edge characteristic for the boundary block needs to be determined. Predicted edge characteristics that may be used in one or more embodiments of the present disclosure are, for example, the orientation of the edge, or the strength of the edge.

Figure 10:
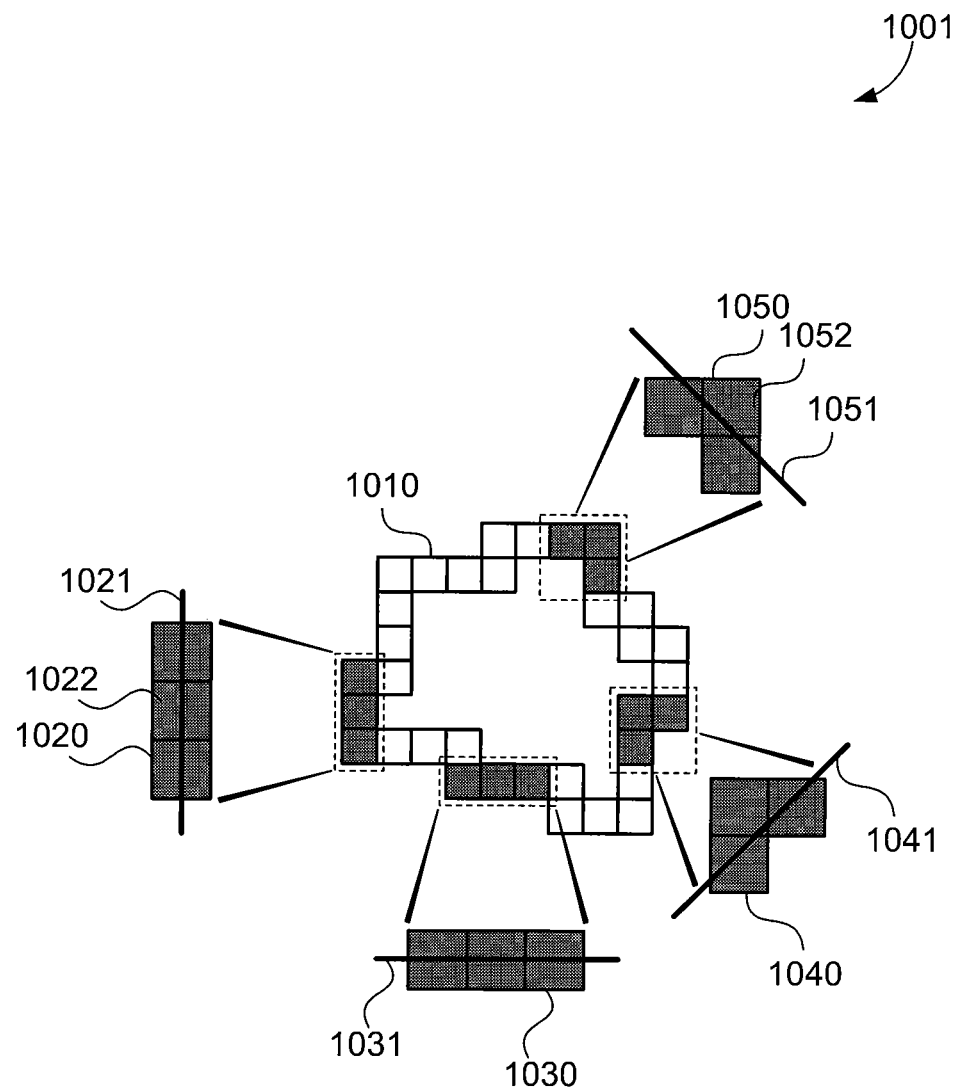
FIG. 10 is a schematic representation illustrating predicted edge characteristics of a detected region of change, according to one embodiment of the present disclosure.

FIG. 10 is a schematic representation of an exploded view 1001 of an example of a set of predicted edge orientations for boundary blocks of a region of change. The exploded view 1001 comprises a set of boundary blocks 1010 of a detected region of change. To determine the edge orientation of a particular boundary block, adjacent boundary blocks to either side of the particular boundary block are checked and the geometrical configurations of the three boundary blocks, being the particular boundary block and the adjacent boundary block on each side, are considered.

For example, if a boundary block 1022 that is presently under consideration is part of a vertical arrangement 1020 in which the adjacent blocks are above and below the boundary block under consideration 1022, a predicted edge orientation associated with the boundary block under consideration 1022 is classified as a vertical line 1021.

As a second example, if a boundary block under consideration 1052 is part of a corner arrangement 1050 in which the adjacent blocks are left and below said block, then a predicted edge orientation associated with the boundary block under consideration 1052 is classified as a sloped line 1051 with a 45 degree angle 10. Further examples of this embodiment are configurations 1030 and 1040, which produce predicted edge orientations 1031 and 1041 respectively.

It is possible for two adjacent blocks of a boundary block under consideration to be the same. Such a scenario may arise, for example, at a corner of a region of change that comprises a single file of blocks either in a horizontal or vertical configuration. In such a situation, a predicted edge orientation associated with the boundary block under consideration will also be horizontal or vertical, respectively.

This embodiment for determining a predicted edge orientation of a boundary block can be extended to examining nearby boundary blocks beyond just the two adjacent blocks.

Determination of Observed Edge Characteristics

After a predicted edge characteristic is determined at step 520 of process 501 of FIG. 5, flow passes to step 530, which determines an observed edge characteristic of the boundary block.

Figure 11:
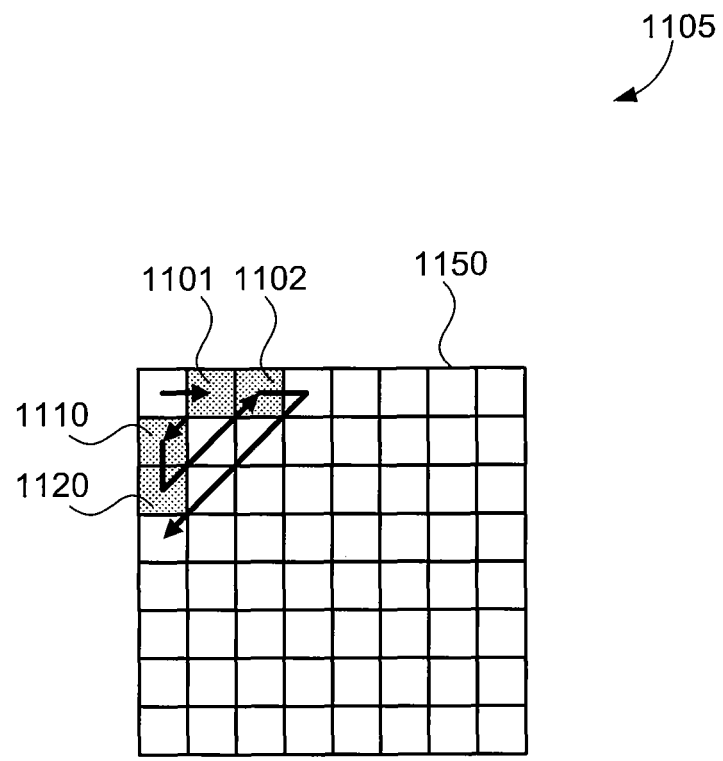
FIG. 11 is a schematic representation illustrating an example of a DCT coefficient table arranged in a zig-zag pattern.

One method of determining observed edge characteristics, such as edge orientation and edge strength, is through calculations using the DCT coefficients of a boundary block under consideration. The DCT coefficients of the boundary block can be obtained from a current frame under consideration, a previous frame, or a weighted average of frames up to and including the current frame. Edges in a block can be considered to be those pixels that have the greatest change in intensity in the Y channel. One embodiment uses only 4 DCT coefficients to calculate the intensity in the Y channel through the equations:

$$f(x) = AC_{01}\cos\left(\frac{\pi}{8}(x+0.5)\right) + AC_{02}\cos\left(\frac{2\pi}{8}(x+0.5)\right) \quad (1)$$

$$f(y) = AC_{10}\cos\left(\frac{\pi}{8}(y+0.5)\right) + AC_{20}\cos\left(\frac{2\pi}{8}(y+0.5)\right) \quad (2)$$

$$(0 \le x \le 7), (0 \le y \le 7)$$

in the horizontal and vertical directions respectively, where x and y are the pixel numbers from the origin. AC represents the DCT coefficients, as shown in FIG. 11 with respect to a DCT coefficient table 1150. Arranging the DCT coefficient table 1150 in a zigzag pattern, as shown, then the coefficients used are $AC_{01}$ 1101, $AC_{02}$ 1102, $AC_{10}$ 1110 and $AC_{20}$ 1120.

The edge strength in the horizontal and vertical directions for the 8 distances can then be calculated by taking the derivative of Equation (1) and Equation (2).

$$f'(x) = -AC_{01}\left(\frac{\pi}{8}\right)\sin\left(\frac{\pi}{8}(x+0.5)\right) - AC_{02}\left(\frac{2\pi}{8}\right)\sin\left(\frac{2\pi}{8}(x+0.5)\right) \quad (3)$$

$$f'(y) = -AC_{10}\left(\frac{\pi}{8}\right)\sin\left(\frac{\pi}{8}(y+0.5)\right) - AC_{20}\left(\frac{2\pi}{8}\right)\sin\left(\frac{2\pi}{8}(y+0.5)\right) \quad (4)$$

$$(0 \le x \le 7), (0 \le y \le 7)$$

Of the 8 values obtained, the maximum value in each direction is used both to calculate the observed edge strength as well as the observed edge orientation in this block. The maximum edge strength is given by $$\text{observed\_edge\_strength} = \sqrt{f'(x)_{max}^2 + f'(y)_{max}^2} \quad (5)$$

and the observed edge orientation (in degrees) by $$\text{observed\_edge\_orientation} = \tan^{-1}\left(\frac{f'(y)_{max}}{f'(x)_{max}}\right) \quad (6)$$

where f'(y) and f'(x) are the maximum values in each direction as calculated using Equation (3) and Equation (4).

Correlation of Predicted and Observed Edge Characteristics

After the observed edge characteristics are calculated at step 530 of process 501 of FIG. 5, flow passes to step 540, which calculates an abandoned/removed (A/V) score for the boundary block under consideration. There are many different schemes that can be used to calculate this score, and one embodiment is discussed below.

If given a single edge characteristic of edge orientation, one possible way of evaluating the A/V score is to look at the correspondence between the predicted and observed edge orientations as defined in FIG. 10 and Equation (6):

$$A/V \text{ score} = 100 - |\text{predicted\_edge\_orientation} - \text{observed\_edge\_orientation}| \quad (7)$$

where the predicted_edge_orientation and observed_edge_orientation are given in degrees. This produces a score that is between 10 and 100, with the larger numbers representing a higher likelihood of the predicted and observed orientations corresponding with each other. Conversely, lower numbers represent a lower likelihood of the predicted and observed orientations corresponding with each other.

One further refinement to this scoring scheme is to factor in the edge characteristic: edge strength. An edge strength threshold can be set such that any boundary block with observed edge strength, as calculated using Equation (5), below the edge strength threshold receives an A/V score of zero. This prevents very weak edges that may be random noise from affecting the final prediction of the algorithm. The threshold can be a user defined value, or alternatively can be set as the average evaluated edge strength of the entire scene at initialisation.

Figure 12:
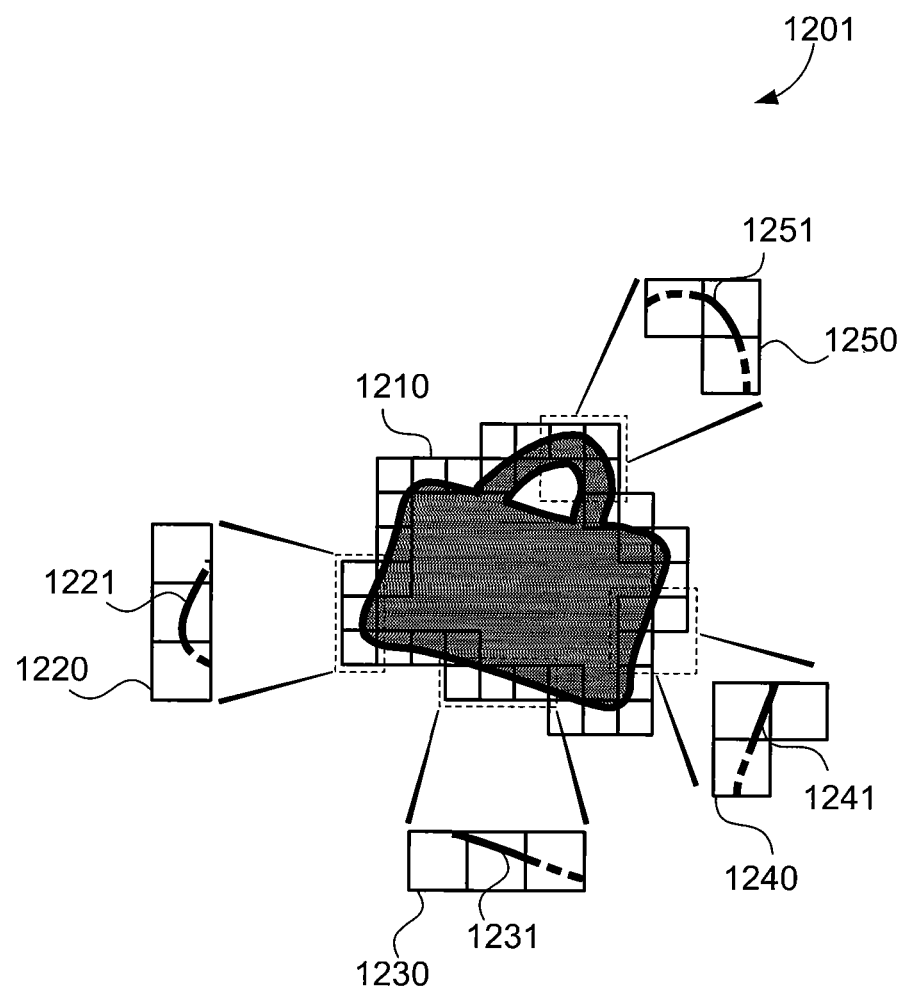
FIG. 12 is a schematic representation illustrating observed edge characteristics of a detected region of change for an abandoned object event, according to one embodiment of the present disclosure.

FIG. 12 is a schematic representation 1201 that shows observed edges of the object 241 from FIG. 2. FIG. 12 comprises a set of boundary blocks 1210 of a detected region of change. For boundary block sets 1220, 1230, 1240 and 1250, which correspond to similar arrangements 1020 to 1050 in FIG. 10, the observed edge orientations are shown as 1221, 1231, 1241 and 1251, respectively.

After the A/V score for the current boundary block is determined in step 540 of process 501 of FIG. 5, flow is directed to step 550 where the score is added to a global total for the detected region of change.

When all the boundary blocks for a particular detected region of change have been processed, the flow of process 501 is directed to step 560 where the global A/V score for the region is normalised by the number of boundary blocks that are used during the processing. The normalisation process produces a score between 10 and 100 for said region that can be used to determine whether the region of change is an abandoned object or a removed object.

Other methods can also be used for calculating a global A/V score. For example, a second method performs the following steps:

A) Initialise an edge strength running total to 0.
B) Initialise an edge angle-strength running total to 0.
C) Initialise a maximum edge strength to 0.
D) For each boundary edge point:
   1. Calculate the observed edge strength, as per Equation (5).
   2. Add the observed edge strength to an edge strength running total.
   3. Calculate the angle-difference, the absolute value of the predicted edge orientation minus the observed edge orientation.
   4. Add the product of the angle-difference and the observed edge strength to an edge angle-strength running total.
   5. If the edge strength is greater than the maximum edge strength, set the maximum edge strength to be the edge strength.
E) Calculate a normalised edge strength running total as the edge strength running total divided by the maximum edge strength.
F) Calculate the total or global A/V score as the edge angle-strength running total divided by the normalised edge strength running total.

This algorithm will produce a number between 0 and 90 (provided the angle differences are calculated in degrees), with numbers towards 90 indicating a greater likelihood of the blob representing a vanished object, and numbers towards 0 indicating a greater likelihood of the blob representing an abandoned object. In this way, boundary edge points with lower observed edge strengths contribute less to the global A/V score. Note that because this method does not use a threshold on edge strength, the maximum edge strength should also be considered as an output of this algorithm, so subsequent decisions on whether the object is abandoned or vanished can override the decision to "vanished", if the maximum edge strength is considered to be too weak to be meaningful. This may occur in situations where there is a very faint outline left by a vanished object (for example, a discoloration behind a removed painting).

The final step 570 of process 501 predicts whether a detected event is an abandoned object event or an object removal event. One embodiment utilises a predetermined, user-defined threshold for the total or global A/V score. A total A/V score above the threshold indicates an abandoned object, and a total A/V score below the threshold indicates a removed object. In another embodiment, the predetermined threshold is based on an average evaluated edge strength of the entire scene at initialisation, as may occur when a system embodying the method is turned on or reset.

In another embodiment, a probabilistic approach is used, in which a likelihood of a detected region of change being an abandoned object or a removed object is calculated based on a value of the global score for the detected region of change and a threshold.

Camera Implementation

Figure 13:
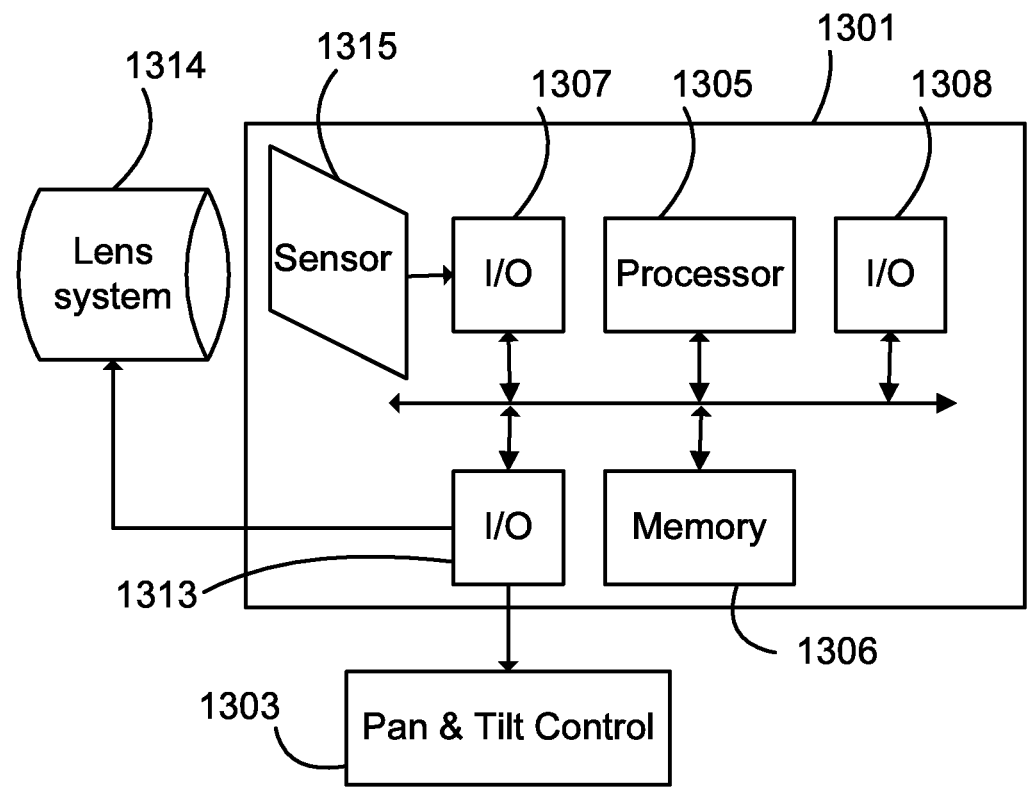
FIG. 13 is a schematic block diagram of a camera upon which the methods of FIGS. 2 to 12 may be practised.

One implementation of a system in accordance with the present disclosure is embodied in a camera. FIG. 13 shows a schematic block diagram of a camera 1300 upon which embodiments for classifying a region of change in a video frame may be practised. In one implementation, the steps of the methods described with reference to FIGS. 2 to 12 are implemented as software executable within the camera 1300. The steps of the methods of FIGS. 2 to 12 may be performed on a single processor or on multiple processors, either within the camera or external to the camera 1300.

The camera 1300 is a pan-tilt-zoom camera (PTZ) formed by a camera module 1301, a pan and tilt module 1303, and a lens system 1314. The camera module 1301 typically includes at least one processor unit 1305, and a memory unit 1306, a photo-sensitive sensor array 1315, an input/output (I/O) interfaces 1307 that couples to the sensor array 1315, an input/output (I/O) interfaces 1308 that couples to a communications network 1320, and an interface 1313 for the pan and tilt module 1303 and the lens system 1314. The components 1305 to 1313 of the camera module 1301 typically communicate via an interconnected bus 1304 and in a manner which results in a conventional mode of operation known to those in the relevant art.

The pan and tilt module 1303 includes servo motors which, in response to signals from the camera module 1301, move the camera module 1301 about the vertical and horizontal axes. The lens system 1314 also includes a servo motor which, in response to signals from the camera module 1301, is adapted to change the focal length of the lens system 1314.

Computer Implementation

Figure 14A:
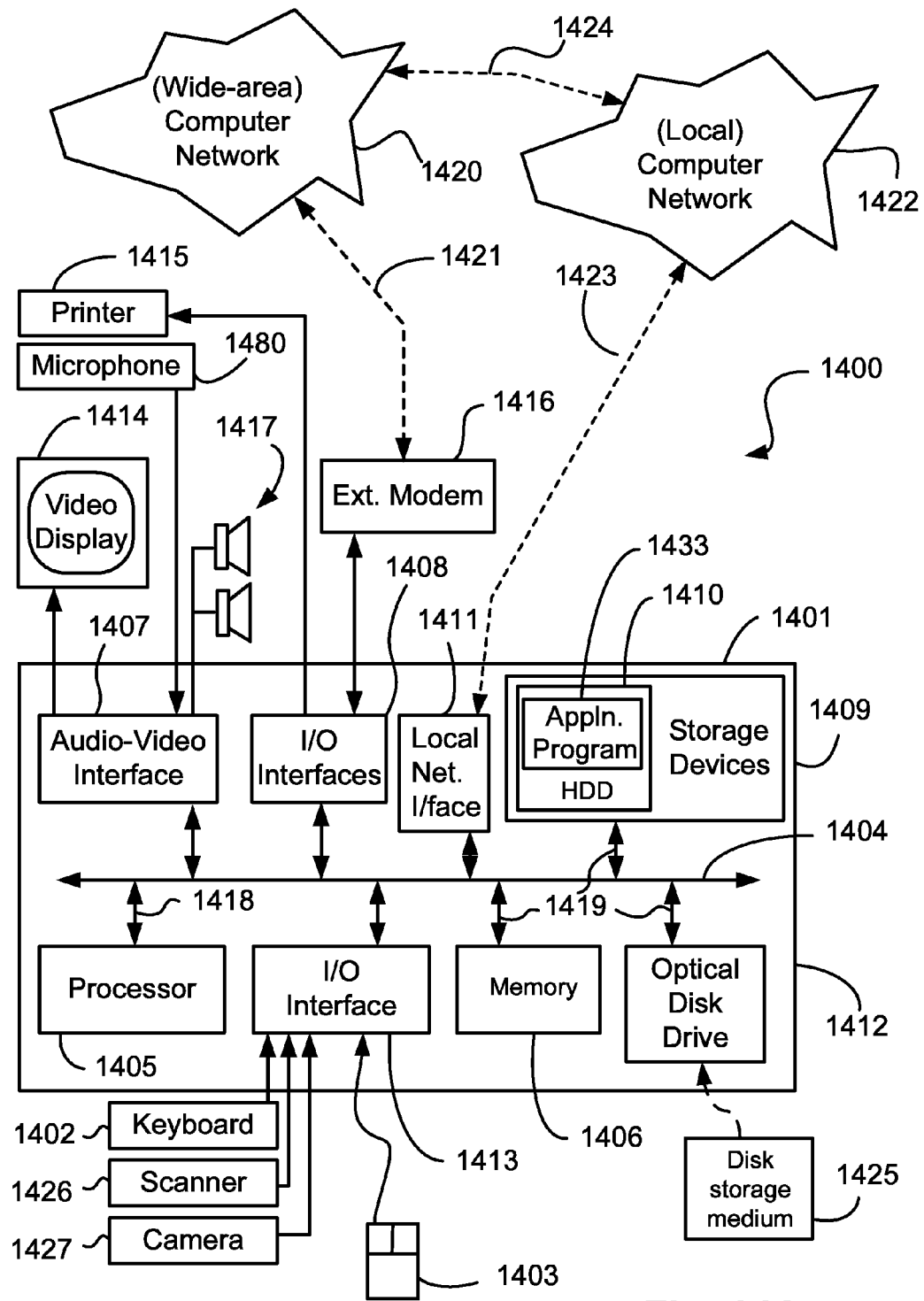
FIGS. 14A and 14B form a schematic block diagram of a general purpose computer system upon which the arrangements described can be practised.
Figure 14B:
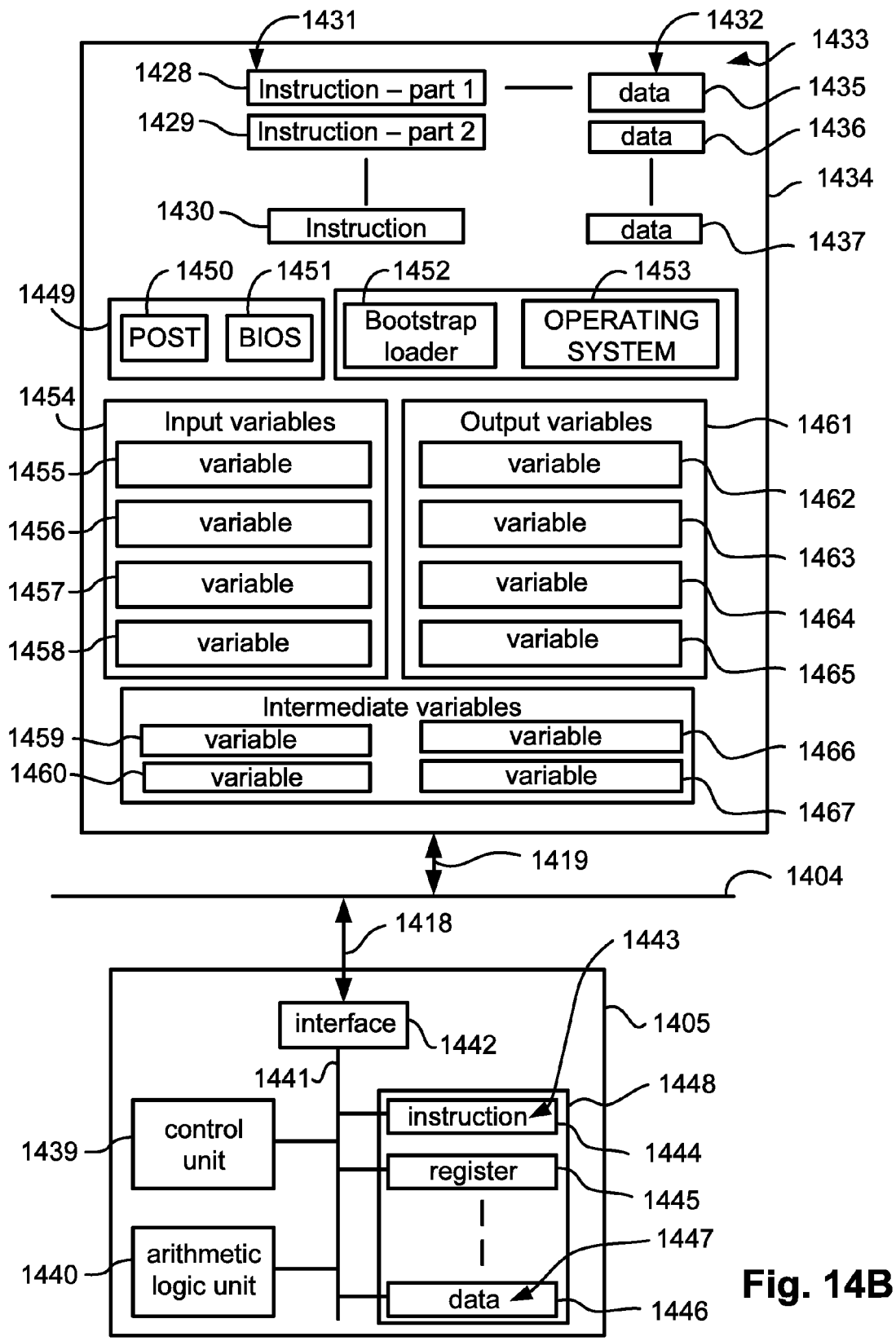

FIGS. 14A and 14B collectively form a schematic block diagram of a general purpose computer system 1400, upon which the various arrangements described can be practised.

As seen in FIG. 14A, the computer system 1400 is formed by a computer module 1401, input devices such as a keyboard 1402, a mouse pointer device 1403, a scanner 1426, a camera 1427, and a microphone 1480, and output devices including a printer 1415, a display device 1414 and loudspeakers 1417. An external Modulator-Demodulator (Modem) transceiver device 1416 may be used by the computer module 1401 for communicating to and from a communications network 1420 via a connection 1421. The network 1420 may be a wide-area network (WAN), such as the Internet or a private WAN. Where the connection 1421 is a telephone line, the modem 1416 may be a traditional "dial-up" modem. Alternatively, where the connection 1421 is a high capacity (eg: cable) connection, the modem 1416 may be a broadband modem. A wireless modem may also be used for wireless connection to the network 1420.

The computer module 1401 typically includes at least one processor unit 1405, and a memory unit 1406 for example formed from semiconductor random access memory (RAM) and semiconductor read only memory (ROM). The module 1401 also includes an number of input/output (I/O) interfaces including an audio-video interface 1407 that couples to the video display 1414, loudspeakers 1417 and microphone 1480, an I/O interface 1413 for the keyboard 1402, mouse 1403, scanner 1426, camera 1427 and optionally a joystick (not illustrated), and an interface 1408 for the external modem 1416 and printer 1415. In some implementations, the modem 1416 may be incorporated within the computer module 1401, for example within the interface 1408. The computer module 1401 also has a local network interface 1411 which, via a connection 1423, permits coupling of the computer system 1400 to a local computer network 1422, known as a Local Area Network (LAN). As also illustrated, the local network 1422 may also couple to the wide network 1420 via a connection 1424, which would typically include a so-called "firewall" device or device of similar functionality. The interface 1411 may be formed by an Ethernet™ circuit card, a Bluetooth™ wireless arrangement or an IEEE 802.11 wireless arrangement.

The interfaces 1408 and 1413 may afford either or both of serial and parallel connectivity, the former typically being implemented according to the Universal Serial Bus (USB) standards and having corresponding USB connectors (not illustrated). Storage devices 1409 are provided and typically include a hard disk drive (HDD) 1410. Other storage devices such as a floppy disk drive and a magnetic tape drive (not illustrated) may also be used. An optical disk drive 1412 is typically provided to act as a non-volatile source of data. Portable memory devices, such optical disks (e.g., CD-ROM, DVD), USB-RAM, and floppy disks for example may then be used as appropriate sources of data to the system 1400.

The components 1405 to 1413 of the computer module 1401 typically communicate via an interconnected bus 1404 and in a manner which results in a conventional mode of operation of the computer system 1400 known to those in the relevant art. Examples of computers on which the described arrangements can be practised include IBM-PCs and compatibles, Sun Sparcstations, Apple Mac™ or alike computer systems evolved therefrom.

The method of classifying a detected region of change of a video frame as one of an abandoned object event and an object removal event may be implemented using the computer system 1400 wherein the processes of FIGS. 2 to 12 may be implemented as one or more software application programs 1433 executable within the computer system 1400. In particular, the steps of the method of classifying a detected region of change of a video frame as one of an abandoned object event and an object removal event are effected by instructions 1431 in the software 1433 that are carried out within the computer system 1400. The software instructions 1431 may be formed as one or more code modules, each for performing one or more particular tasks. The software may also be divided into two separate parts, in which a first part and the corresponding code modules performs the determining and classifying methods and a second part and the corresponding code modules manage a user interface between the first part and the user.

The software 1433 is generally loaded into the computer system 1400 from a computer readable medium, and is then typically stored in the HDD 1410, as illustrated in FIG. 14A, or the memory 1406, after which the software 1433 can be executed by the computer system 1400. In some instances, the application programs 1433 may be supplied to the user encoded on one or more CD-ROM 1425 and read via the corresponding drive 1412 prior to storage in the memory 1410 or 1406. Alternatively the software 1433 may be read by the computer system 1400 from the networks 1420 or 1422 or loaded into the computer system 1400 from other computer readable media. Computer readable storage media refers to any storage medium that participates in providing instructions and/or data to the computer system 1400 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 1401. Examples of computer readable transmission is media that may also participate in the provision of software, application programs, instructions and/or data to the computer module 1401 include radio or infra-red transmission channels as well as a network connection to another computer or networked device, and the Internet or Intranets including e-mail transmissions and information recorded on Websites and the like.

The second part of the application programs 1433 and the corresponding code modules mentioned above may be executed to implement one or more graphical user interfaces (GUIs) to be rendered or otherwise represented upon the display 1414. Through manipulation of typically the keyboard 1402 and the mouse 1403, a user of the computer system 1400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1417 and user voice commands input via the microphone 1480.

FIG. 14B is a detailed schematic block diagram of the processor 1405 and a "memory" 1434. The memory 1434 represents a logical aggregation of all the memory devices (including the HDD 1410 and semiconductor memory 1406) that can be accessed by the computer module 1401 in FIG. 14A.

When the computer module 1401 is initially powered up, a power-on self-test (POST) program 1450 executes. The POST program 1450 is typically stored in a ROM 1449 of the semiconductor memory 1406. A program permanently stored in a hardware device such as the ROM 1449 is sometimes referred to as firmware. The POST program 1450 examines hardware within the computer module 1401 to ensure proper functioning, and typically checks the processor 1405, the memory (1409, 1406), and a basic input-output systems software (BIOS) module 1451, also typically stored in the ROM 1449, for correct operation. Once the POST program 1450 has run successfully, the BIOS 1451 activates the hard disk drive 1410. Activation of the hard disk drive 1410 causes a bootstrap loader program 1452 that is resident on the hard disk drive 1410 to execute via the processor 1405. This loads an operating system 1453 into the RAM memory 1406 upon which the operating system 1453 commences operation. The operating system 1453 is a system level application, executable by the processor 1405, to fulfil various high level functions, including processor management, memory management, device management, storage management, software application interface, and generic user interface.

The operating system 1453 manages the memory (1409, 1406) in order to ensure that each process or application running on the computer module 1401 has sufficient memory in which to execute without colliding with memory allocated to another process. Furthermore, the different types of memory available in the system 1400 must be used properly so that each process can run effectively. Accordingly, the aggregated memory 1434 is not intended to illustrate how particular segments of memory are allocated (unless otherwise stated), but rather to provide a general view of the memory accessible by the computer system 1400 and how such is used.

The processor 1405 includes a number of functional modules including a control unit 1439, an arithmetic logic unit (ALU) 1440, and a local or internal memory 1448, sometimes called a cache memory. The cache memory 1448 typically includes a number of storage registers 1444-1446 in a register section 1443. One or more internal buses 1441 functionally interconnect these functional modules. The processor 1405 typically also has one or more interfaces 1442 for communicating with external devices via the system bus 1404, using a connection 1418.

The application program 1433 includes a sequence of instructions 1431 that may include conditional branch and loop instructions. The program 1433 may also include data 1432 which is used in execution of the program 1433. The instructions 1431 and the data 1432 are stored in memory locations 1428-1430 and 1435-1437 respectively. Depending upon the relative size of the instructions 1431 and the memory locations 1428-1430, a particular instruction may be stored in a single memory location as depicted by the instruction shown in the memory location 1430. Alternately, an instruction may be segmented into a number of parts each of which is stored in a separate memory location, as depicted by the instruction segments shown in the memory locations 1428-1429.

In general, the processor 1405 is given a set of instructions which are executed therein. The processor 1405 then waits for a subsequent input, to which it reacts to by executing another set of instructions. Each input may be provided from one or more of a number of sources, including data generated by one or more of the input devices 1402, 1403, data received from an external source across one of the networks 1420, 1422, data retrieved from one of the storage devices 1406, 1409 or data retrieved from a storage medium 1425 inserted into the corresponding reader 1412. The execution of a set of the instructions may in some cases result in output of data. Execution may also involve storing data or variables to the memory 1434.

The disclosed classification arrangements use input variables 1454, that are stored in the memory 1434 in corresponding memory locations 1455-1458. The classification arrangements produce output variables 1461, that are stored in the memory 1434 in corresponding memory locations 1462-1465. Intermediate variables may be stored in memory locations 1459, 1460, 1466 and 1467.

The register section 1444-1446, the arithmetic logic unit (ALU) 1440, and the control unit 1439 of the processor 1405 work together to perform sequences of micro-operations needed to perform "fetch, decode, and execute" cycles for every instruction in the instruction set making up the program 1433. Each fetch, decode, and execute cycle comprises:

(a) a fetch operation, which fetches or reads an instruction 1431 from a memory location 1428;

(b) a decode operation in which the control unit 1439 determines which instruction has been fetched; and (c) an execute operation in which the control unit 1439 and/or the ALU 1440 execute the instruction.

Thereafter, a further fetch, decode, and execute cycle for the next instruction may be executed. Similarly, a store cycle may be performed by which the control unit 1439 stores or writes a value to a memory location 1432.

Each step or sub-process in the processes of FIGS. 2 to 12 is associated with one or more segments of the program 1433, and is performed by the register section 1444-1447, the ALU 1440, and the control unit 1439 in the processor 1405 working together to perform the fetch, decode, and execute cycles for every instruction in the instruction set for the noted segments of the program 1433.

The method of classifying a detected region of change of a video frame as one of an abandoned object event and an object removal event may alternatively be implemented in dedicated hardware such as one or more integrated circuits performing the functions or sub functions of determining predicted and observed edge characteristics, individual and global scores, and classifying regions of change. Such dedicated hardware may include graphic processors, digital signal processors, or one or more microprocessors and associated memories.

INDUSTRIAL APPLICABILITY

The arrangements described are applicable to the computer and data processing industries and particularly for the imaging, data processing, and surveillance industries.

The foregoing describes only some embodiments of the present invention, and modifications and/or changes can be made thereto without departing from the scope and spirit of the invention, the embodiments being illustrative and not restrictive.

The invention claimed is:

1. A computer-implementable method for classifying a detected region of change of a video frame as one of an abandoned object event and an object removal event, wherein a plurality of boundary blocks define a boundary of the region of change, said method comprising the steps of:
   (a) for each boundary block of a set of the boundary blocks:
      (i) determining an observed edge characteristic of the boundary block, the observed edge characteristic including an observed edge orientation;
      (ii) determining a predicted edge characteristic for the boundary block based on a configuration of the boundary block and other boundary blocks adjacent to the boundary block, the predicted edge characteristic including a predicted edge orientation; and
      (iii) determining an individual block score for the boundary block, based at least upon a correspondence between the predicted edge orientation for the boundary block and the observed edge characteristic orientation for the boundary block;
   (b) determining a total score for the region of change, based on the individual block scores of the boundary blocks; and
   (c) classifying the region of change as the one of an abandoned object event and an object removal event based on the total score.

2. The method according to claim 1, wherein the region of change is defined by a set of spatially adjacent elements that differ from a background model of a scene in the video frame, and
   wherein the plurality of boundary blocks comprise the outer boundary of those elements.

3. The method according to either one of claims 1 and 2, wherein each boundary block is a Discrete Cosine Transform (DCT) block of a JPEG image.

4. The method according to claim 1, wherein the boundary blocks used in steps (b) and (c) are from the same video frame.

5. The method according to claim 1, wherein the configuration is determined based on a relative position of at least one neighbouring boundary block for each boundary block.

6. The method according to claim 1, wherein the predicted edge characteristic is determined based on user input.

7. The method according to claim 1, wherein the predicted edge characteristic is determined based on a geometrical attribute of the boundary.

8. The method according to claim 3, wherein the observed edge characteristic of each one of the set of boundary blocks is determined based at least on DCT coefficients of the boundary block.

9. The method according to claim 1, wherein determining the total score for the region of change includes computing a sum of the individual block scores and normalizing the sum by the number of boundary blocks in the set of boundary blocks.

10. The method according to claim 1, wherein the set of boundary blocks includes all of the boundary blocks that define the boundary of the region of change.

11. The method according to claim 1, wherein the set of boundary blocks is a subset of the boundary blocks that define the boundary of the region of change.

12. A non-transitory tangible computer-readable storage medium having recorded thereon a computer program for directing a processor to execute a method for classifying a detected region of change of a video frame as one of an abandoned object event and an object removal event, wherein a plurality of boundary blocks define a boundary of the region of change, said computer program comprising:
   (a) code for processing each boundary block of a set of the boundary blocks to:
      (i) determine a predicted edge characteristic for the boundary block based on a configuration of the boundary block and other boundary blocks adjacent to the boundary block, the predicted edge characteristic including a predicted edge orientation;
      (ii) determine an observed edge characteristic for the boundary block, the observed edge characteristic including an observed edge orientation; and
      (iii) determine an individual block score for the boundary block, based on at least a correspondence between the predicted edge orientation for the boundary block and the observed edge orientation for the boundary block;
   (b) code for determining a global score for the region of change, based on the individual block scores of the boundary blocks; and
   (c) code for classifying the region of change as the one of an abandoned object event and an object removal event, by comparing the global score with a predetermined threshold.

13. A camera system for classifying a detected region of change of a video frame as one of an abandoned object event and an object removal event, wherein a plurality of boundary blocks define a boundary of the region of change, said camera system comprising:
   a lens system;
   a camera module coupled to said lens system to capture the video frame;
   a storage device for storing a computer program; and
   a processor for executing the program, the program comprising:
   (a) code for processing each one of a set of the boundary blocks to:
      (i) determine a predicted edge characteristic for the boundary block based on a configuration of the boundary block and other boundary blocks adjacent to the boundary block, the predicted edge characteristic including a predicted edge orientation;
      (ii) determine an observed edge characteristic for the boundary block, the observed edge characteristic including an observed edge orientation; and
      (iii) determine an individual block score for the boundary block, based on at least a correspondence between the predicted edge orientation for the boundary block and the observed edge orientation for the boundary block;
   (b) code for determining a global score for the region of change, based on the individual block scores of the boundary blocks; and
   (c) code for classifying the region of change as the one of an abandoned object event and an object removal event, by comparing the global score with a predetermined threshold.

14. The method according to claim 1, wherein the total score is compared to a predetermined threshold to classify the region of change as one of an abandoned object event and an object removal event, the predetermined threshold being determined by one of:
   (a) averaging an edge strength of the region of change at initialization;
   (b) averaging an edge strength of a relevant background model; and
   (c) receiving the predetermined threshold from a user.

15. The method according to claim 14, wherein a total score above the predetermined threshold indicates an abandoned object, and a total score below the predetermined threshold indicates a removed object.

\* \* \* \* \*